United States Patent
Berg et al.

(10) Patent No.: US 7,384,253 B2
(45) Date of Patent: Jun. 10, 2008

(54) METHOD AND DEVICE FOR COATING THE SURFACE OF AN INTERIOR COMPONENT FOR MOTOR VEHICLES

(75) Inventors: Matthias Berg, Steinheim (DE); Ralf Kupferer, Stuttgart (DE); Martin Ehrath, Goeppingen (DE)

(73) Assignee: Erwin Behr Automotive GmbH, Wendlingen (DE)

(*) Notice: Subject to any disclaimer, the term of this patent is extended or adjusted under 35 U.S.C. 154(b) by 0 days.

(21) Appl. No.: 11/698,005

(22) Filed: Jan. 24, 2007

(65) Prior Publication Data

US 2007/0137557 A1 Jun. 21, 2007

Related U.S. Application Data

(60) Division of application No. 10/176,137, filed on Jun. 19, 2002, now Pat. No. 7,214,340, which is a continuation of application No. PCT/EP00/13083, filed on Dec. 21, 2000.

(30) Foreign Application Priority Data

Dec. 22, 1999 (DE) ................. 199 61 992

(51) Int. Cl.
*B29C 45/14* (2006.01)
*B29C 45/26* (2006.01)
(52) U.S. Cl. .............. 425/127; 249/83; 249/165; 249/170; 425/174.4; 425/451.9
(58) Field of Classification Search ......... 425/123, 425/127, 174.4, 451.9; 249/83, 165, 170
See application file for complete search history.

(56) References Cited

U.S. PATENT DOCUMENTS

| 4,637,904 | A | | 1/1987 | Rounds |
| 4,806,094 | A | * | 2/1989 | Rhodes et al. .............. 425/127 |
| 5,746,967 | A | * | 5/1998 | Hoy et al. ............... 425/174.4 |
| 5,843,486 | A | * | 12/1998 | Kurosaki et al. ......... 425/174.4 |
| 6,863,515 | B2 | * | 3/2005 | Nakamichi et al. ...... 425/174.4 |
| 2005/0025910 | A1 | * | 2/2005 | Ehrath ......................... 428/31 |

FOREIGN PATENT DOCUMENTS

| DE | 38 19 627 | 12/1989 |
| DE | 43 20 893 | 7/1994 |
| DE | 43 36 550 | 5/1995 |
| DE | 198 19 133 | 11/1999 |
| EP | 0 978 369 | 2/2000 |

* cited by examiner

*Primary Examiner*—Robert B Davis
(74) *Attorney, Agent, or Firm*—Lipsitz & McAllister, LLC

(57) ABSTRACT

To provide a method for coating the surface of an interior component for motor vehicles which can be carried out in a cost-effective and simple way it is proposed that the interior component is positioned at a distance from a molded part in the region of its surface to be coated, so that a gap is formed between the surface to be coated and the molded part, that the interior component is braced with the molded part, the gap is filled with a liquid surface coating material and said material is cured by exposure to UV radiation. Also proposed are a device for carrying out the method and an interior component which is produced by using the method.

13 Claims, 2 Drawing Sheets

METHOD AND DEVICE FOR COATING THE SURFACE OF AN INTERIOR COMPONENT FOR MOTOR VEHICLES

This application is a divisional of U.S. patent application Ser. No. 10/176,137 filed on Jun. 19, 2002, which is a continuation of international application No. PCT/EP00/13083 of Dec. 21, 2000 and which claims the benefit of German application No. 199 61 992.1 filed on Dec. 22, 1999, each of which is incorporated herein and made a part hereof by reference.

BACKGROUND OF THE INVENTION

The present invention relates to a method for coating the surface of an interior component for motor vehicles, in which at least one visible side of the interior component is provided with a preferably transparent surface layer, in that the interior component is positioned at a distance from a wall of a molded part in the region of its surface to be coated, so that a gap is formed between the wall and the surface to be coated, the gap is filled with a liquid surface coating material and said material is cured by exposure to ultraviolet radiation.

The invention also relates to a device for using such a method and an interior component which is produced by using the method.

Interior components with a coated, for example varnished, surface are increasingly being used for the interior trim of motor vehicles. Used in particular for this purpose are wooden molded parts, which may be formed as solid parts or as veneered parts. The latter are usually provided on their rear side with a reinforcing element, for example of plastic. On the visible side of the interior component, a transparent varnish or resin layer is generally applied, so that a usually glossy and hard-wearing surface is produced. In the case of wooden molded parts, the structure of the wood not only remains visible, but is additionally emphasized. For this purpose, the interior component is usually provided with a layer of varnish approximately 0.5 mm to about 0.8 mm thick.

The resins or varnishes are generally sprayed or painted onto the surface to be coated of the interior component. In this case, several layers are required, to obtain the desired sealing and a glossy surface. This results in a considerable outlay in terms of cost and time.

In DE 41 24 297 C2 it is alternatively proposed to apply a coating of polymethyl methacrylate (PMMA) to the interior component by injection molding. In this case, the PMMA material is intensely heated and pressed under very high pressure, usually over 400 bar, in fractions of a second into an injection mold, into which the interior component has been placed. The injection mold must in this case be formed in a very solid way on account of the high pressure and temperature loading.

In DE 43 20 893 C1 it is proposed to place the interior component into a cavity of a molded part, a gap being formed between the surface region to be coated of the interior component and the associated wall of the cavity, which gap is filled with the liquid surface coating material after the cavity has previously been evacuated, at least partially. This method also entails a not inconsiderable outlay.

It is an object of the present invention to provide a method for coating the surface of an interior component for motor vehicles which can be carried out in a cost-effective and simple way.

SUMMARY OF THE INVENTION

This object is achieved according to the invention in the case of a method of the type stated at the beginning by the interior component being braced with the molded part.

In the case of the method according to the invention, it is merely required to place the interior component to be coated against the molded part in the region of the surface to be coated, thereby forming a gap, and then to brace it with the molded part. The gap is subsequently filled with the liquid coating material and said material is cured, the curing being performed by exposure to UV radiation. It is consequently not necessary to use two mold halves to form a cavity into which the interior component to be coated is introduced; instead, the interior component itself can be braced with the molded part. This can be performed for example by means of clamping jaws or with the aid of a clamping lever. Use of the method is consequently distinguished by low outlay on apparatus.

The gap is preferably filled with the liquid surface coating material under a small positive pressure, in particular a positive pressure of at least 0.2 bar. It has been found that a small positive pressure is already sufficient to obtain a quality of the surface layer satisfying even high requirements for the surface finish to be achieved.

It is particularly favorable if the gap is filled with the liquid surface coating material under a positive pressure of approximately 0.3 bar to about 3.5 bar, preferably 0.5 to 2 bar. With such a positive pressure, it can be ensured that the liquid surface coating material is uniformly distributed in the gap, with virtually no gas bubbles being formed.

A material with at least two components is preferably used for the surface coating material, a first component being formed by synthetic resin and the second component being formed by UV-radiation-sensitive sensitizers. The sensitizers are selected such that, under exposure to UV radiation, they trigger in the surface coating material a chain reaction which leads to curing. The proportion of UV-radiation-sensitive sensitizers is preferably chosen such that, under exposure to UV radiation within a time period of a few minutes, for example less than 3 minutes, the surface coating material cures, at least to the extent that the interior component provided with the surface layer can be released from the molded part and can be handled. The entire surface coating can consequently be carried out within a few minutes.

Polyester or a polyurethane-, acrylic- or epoxy-based synthetic resin can preferably be used as the synthetic resin.

The exposure of the surface coating material within the gap can be performed by the UV radiation being introduced into the gap via optical fibers. In the case of a particularly preferred embodiment of the method according to the invention, it is provided that the surface coating material with which the gap is filled is exposed to UV radiation through the molded part formed in a correspondingly radiation-transparent way.

For example, it may be provided that the molded part is produced from UV-radiation-transparent plastic or a corresponding glass material, for example quartz glass.

A molded part which has only a low absorption for UV radiation is preferably used, so that as large a proportion as possible of the UV radiation provided by a UV radiation source impinges on the surface coating material in the gap. It has proven to be advantageous for this purpose if the molded part is of a multi-part form, with a UV-radiation-transparent mold, substantially corresponding to the shape of the surface to be coated of the interior component, and a supporting element supporting the mold. Such a multi-part configuration of the molded part makes it possible to select different materials, depending on the desired function, which however are in any event transparent to UV radiation. The supporting element can in this case be produced for example from PMMA, polycarbonate (PC), polyester, polypropylene (PP), polyethylene (PE) or from glass, in particular quartz glass, while the use of silicone has proven to be particularly successful for the mold. Silicone has, on the one hand, a high UV radiation transparency and can, on the other hand, be separated very well from the cured surface material, that is to say it has virtually no adhesion to the cured surface material. What is more, use of the silicone material has the advantage that a casting can be created in a simple way, in order to achieve virtually any desired surface configuration for the interior component in this way, for example decorative, fluting and/or matt-finishing effects.

If the mold, preferably produced from silicone material, is supported by means of the supporting element, the mold can be formed with a relatively small material thickness, so that radiation losses by absorption can be kept particularly low.

Alternatively, the molded part may also be produced in one piece from silicone material. In order in this case to lend the molded part the necessary mechanical stability, an adequate wall thickness must be chosen. To compensate for resultant radiation losses by absorption, a correspondingly intensive UV radiation source can be used.

It is of advantage if the liquid surface coating material is degassed, for example by subjecting it to a negative pressure, before the gap is filled with it.

It has been found that, in particular when the small positive pressure mentioned at the beginning is applied, the liquid surface coating material can be uniformly distributed in the gap. In order that small air bubbles possibly occurring are not visible to a viewer after curing, it has proven to be advantageous if the interior component to be coated is placed onto the molded part from above in such a way that the surface to be coated forms the underside of the interior component during the coating. This has the consequence that any small air bubbles which may be present rise upward in the direction of the interior component after the gap has been filled with the surface coating material. If a porous wooden molded part is used for said interior component, the small gas or air bubbles diffuse into the wooden molded part and are virtually invisible to a viewer after curing.

To achieve a high-gloss surface, the molded part may be provided in the region of the gap with a high-gloss surface; however—as already mentioned—in particular when using a silicone material for the molded part or the mold, structurings are also possible, in order to achieve in this way, for example, a matt surface or a fluted surface for the cured surface layer.

The invention is also based on the object of providing a device for coating an interior component for motor vehicles, with which the method explained above can be carried out.

For this purpose, the invention proposes a device for coating the surface of an interior component for motor vehicles, in particular for carrying out the method stated above, with a molded part, it being possible for the interior component to be placed against the molded part at a distance from a wall of the molded part in the region of its surface to be coated, thereby forming a gap, and with a clamping device for the bracing of the interior component with the molded part. All that is required for the coating is to place the interior component against the molded part, a gap being formed in the region of the surface to be coated, which gap is filled with the liquid surface coating material after the interior component has first being braced with the molded part. The clamping device used for this preferably comprises a frame and a clamping element, which can be placed against the interior component on the side facing away from the molded part. The frame serves here for the mounting of the molded part, which is preferably releasably connectable to the frame.

In order to ensure that the entire gap can be irradiated substantially uniformly with UV radiation, the molded part is preferably configured such that it is transparent to UV radiation, at least in the region of the surface to be coated, so that there is no longer any need for additional light guiding elements for the UV radiation.

In the case of a particularly preferred embodiment of the device according to the invention, it is provided that the molded part comprises a supporting element, for example a supporting plate, which is transparent to UV radiation and can be mechanically loaded, for taking up the clamping forces of the clamping device.

The supporting element may, for example, be produced from a UV-radiation-transparent plastics or glass material, for example from PMMA, PC, polyester, PP, PE or glass, preferably quartz glass.

It is favorable if the molded part has a UV-radiation-transparent mold which substantially corresponds to the shape of the surface to be coated of the interior component and is preferably produced from silicone.

In order to achieve a defined separating line between the surface region to be coated of the interior component and an uncoated surface region, it is favorable if the device comprises a sealing element surrounding the interior component in the circumferential direction in the region of the surface to be coated. In this way it can be ensured in particular that securing elements which are provided on the interior component to fix it on the motor vehicle do not come into contact with liquid surface coating material, so that the function of the securing elements is not impaired by cured surface coating material.

It is particularly favorable here if the sealing element is connected in one piece to the mold. For example, it may be provided that the mold is produced with a sealing element of silicone.

The molded part preferably forms a receptacle or depression for forming the gap, and the interior component can be placed onto the receptacle. The receptacle may, for example, be configured in the form of a trough, so that the interior component can be introduced into the receptacle to such an extent that the desired gap is ensured.

As already explained, the interior component is braced with the molded part. In order to ensure a constant distance between the interior component and the molded part in spite of the bracing, it is of advantage if the device comprises at least one spacing element, which can be positioned in the region of the surface to be coated of the interior component. For example, four spacing elements, which are arranged in a uniformly distributed manner in the region of the gap, may be used. It is favorable here if the spacing element or elements are produced from silicone or from polished metal, since these materials have low adhesion on the cured surface coating material.

The following description of preferred embodiments of the invention serves together with the drawing for a more detailed explanation.

DETAILED DESCRIPTION

Figure 1:
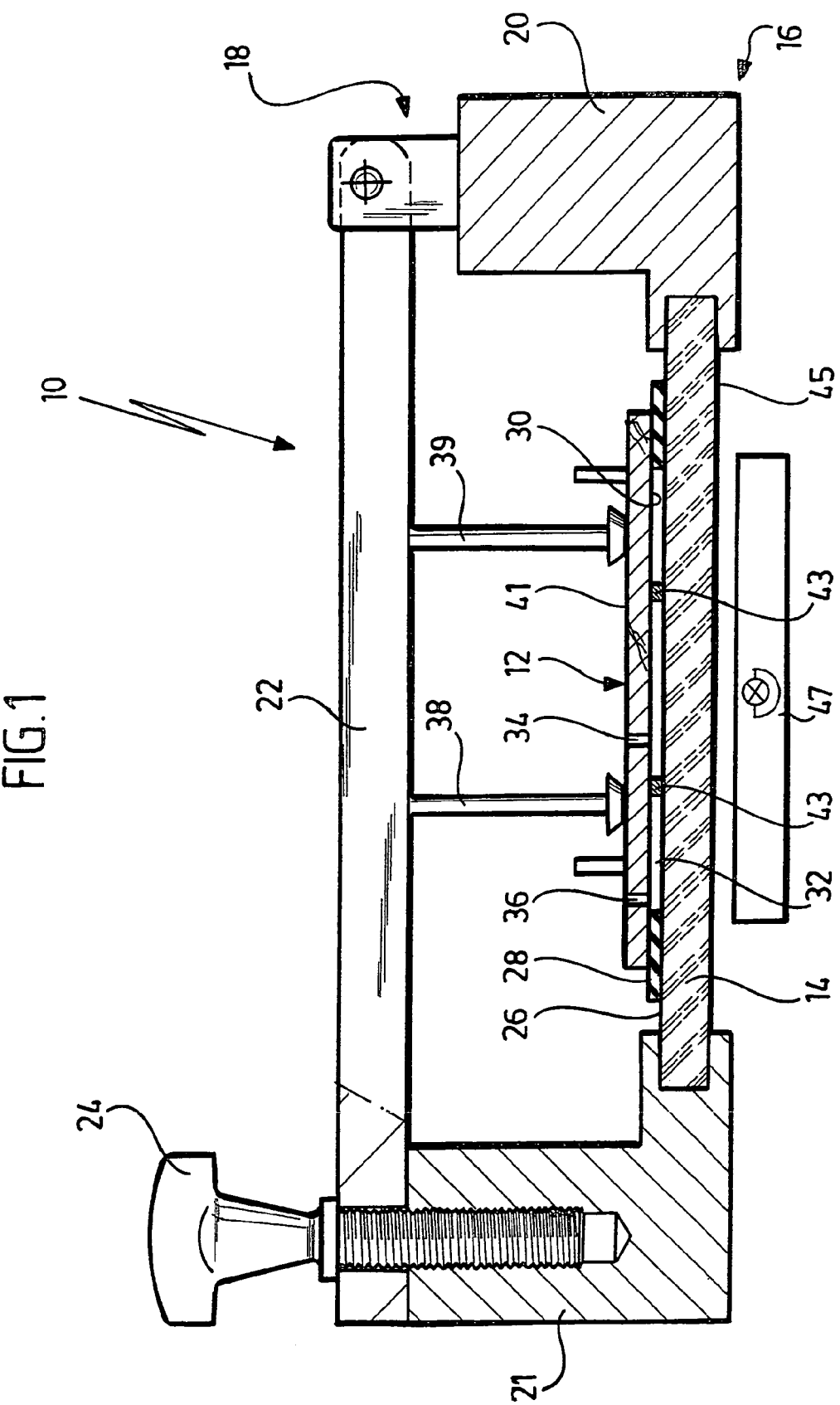
FIG. 1 shows a schematic representation of a first embodiment of a device for coating an interior component.

In FIG. 1, a device designated overall by the reference numeral 10 for coating an interior component 12 is represented. The device 10 comprises a molded part of quartz glass, formed as a supporting plate 14, which has only low absorption for ultraviolet (UV) radiation. The supporting plate 14 is surrounded by a frame 16 of a clamping device 18. The frame is connected in one piece to two upwardly protruding legs 20, 21, a pivotable clamping lever 22, which can be screwed to the second leg 21 by means of a clamping screw 24, being articulated on the upper side of the first leg 20, facing away from the frame 16.

On its upper side 26, facing the clamping lever 22, the supporting plate 14 carries a sealing element in the form of a sealing ring 28 of silicone material, and the interior component 12 is placed onto the sealing ring 28. The sealing ring 28 ensures that a gap 32 is formed between the surface 30 to be coated of the interior component 12 and the upper side 26 of the supporting plate 14, which gap can be filled with a liquid surface coating material via a filling opening 34 provided in the interior component 12. In order that the air located in the gap 32 can escape when the gap is filled with the surface coating material, an outlet opening 36 is additionally provided in the interior component 12.

By means of the clamping lever 22, the interior component 12 can be braced with the supporting plate 14. For this purpose, the clamping lever 22 is connected in one piece to clamping pins 38, 39, which project in the direction of the supporting plate 14 and the free ends of which can be placed against the rear side 41 of the interior component 12, facing away from the gap 32, so that the interior component 12 is braced with the supporting plate 14.

In the region of the gap 32, a plurality of spacers 43 are arranged on the upper side 26 of the supporting plate 14 to support the interior component 12, so that a constant spacing of, for example, 0.5 mm to about 0.8 mm between the surface 30 to be coated of the interior component 12 and the upper side 26 of the supporting plate 14 is ensured in spite of the clamping force acting. In a way similar to the sealing ring 28, the spacers 43 are preferably produced from silicone, since this has virtually no adhesion on the cured surface coating material.

Arranged on the underside 45 of the supporting plate 14, facing away from the interior component 12, is a UV radiation source 47, only schematically represented in the drawing, so that the gap 32 can be exposed to UV radiation through the supporting plate 14 after filling with liquid surface coating material. The surface coating material is of a two-component form, with a polyester as a first component and with UV sensitizers as a second component, the latter effecting curing of the polyester under UV radiation exposure.

To coat the interior component in the region of the surface 30, it is merely required to place that interior component 12 onto the supporting plate 14 and the sealing ring 28 and subsequently brace it with the supporting plate 14 by means of the clamping device 18. The gap 32 can then be filled with the liquid surface coating material via the filling opening 34 and said material can be cured by means of UV radiation exposure. The coated interior component 12 can then be released again from the supporting plate 14. In most cases, further working of the coated interior component 12 is no longer required.

Figure 2:
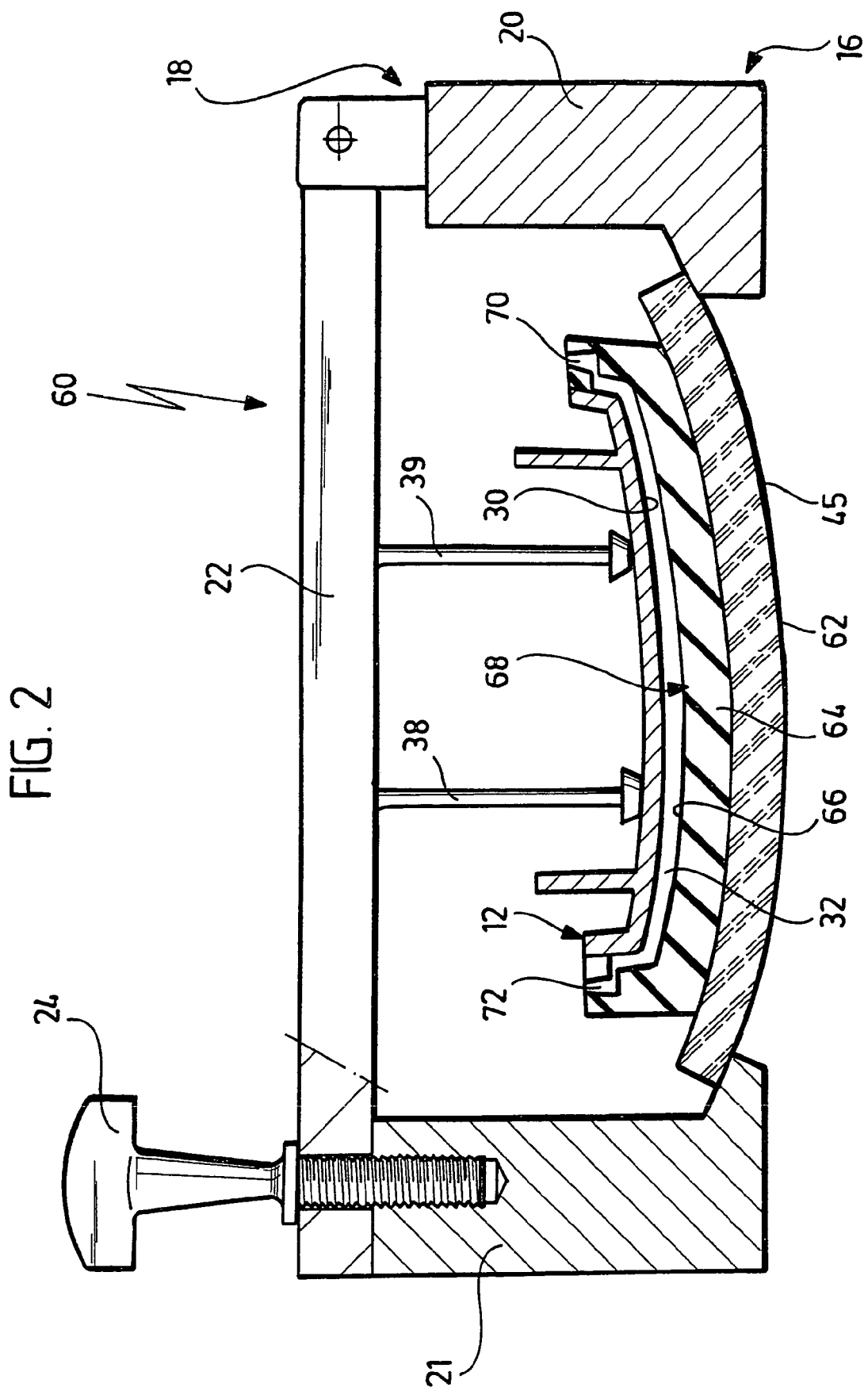
FIG. 2 shows a second embodiment of a device for coating an interior component.

In FIG. 2, an alternative configuration of a device for coating the interior component is represented. This is designated overall by the reference numeral 60 and has a construction similar to the embodiment represented in FIG. 1. Therefore, the same reference numerals as in FIG. 1 have been used in FIG. 2 for identical components. The embodiment represented in FIG. 2 differs substantially in that a two-part molded part is used, a mold 64 of silicone material being provided in addition to a supporting plate 62, said mold forming on its upper side 66, facing away from the supporting plate 62, a trough-shaped receptacle 68, the shape of which substantially corresponds to the shape of the convexly curved interior component 12 in FIG. 2.

The mold 64 is produced from silicone and is supported by the supporting plate 62, which is produced from a quartz glass. For filling the gap 32 formed between the surface 30 to be coated of the interior component 12 and the upper side 66 of the mold 44 with liquid surface coating material, the mold 64 comprises a filling channel 70 and an outlet channel 72.

By means of the clamping device 18, the interior component 12 can be braced with the mold 64 and the supporting plate 62, and the gap 32 can subsequently be filled with liquid surface coating material via the filling channel 70. It is also the case with the second embodiment, represented in FIG. 2, that a UV radiation source, not represented in FIG. 2, is positioned on the side of the supporting plate 62 facing away from the interior component 12, so that the gap 32 can be exposed to UV radiation for the curing of the surface coating material.

The use of the silicone mold 64 has the advantage that even complicatedly shaped interior components 12 can be coated in a simple way, since a casting of the interior component 12 in the region of the surface 30 to be coated can be produced in a simple way by means of the silicone material and the silicone material can be supported by means of the supporting plate 62.

Both in the case of the first exemplary embodiment, represented in FIG. 1, and in the case of the second embodiment, schematically represented in FIG. 2, the gap 32 is filled with the liquid surface coating material under a small positive pressure of approximately 0.5 to 2 bar. Before this, the surface coating material can be degassed, in that it is subjected to negative pressure. Should gas bubbles develop during the filling of the gap 32, they rise upward in the direction of the surface 30 to be coated of the interior component 12 and penetrate into its porous surface, so that the gas bubbles are no longer visible to the viewer after curing of the surface coating material.

What is claimed is:

1. A device for coating the surface of an interior component for motor vehicles, comprising:
   a molded part adapted for holding the interior component at a distance from a wall of the molded part in a region of a surface to be coated of the interior component, thereby forming a gap between the surface to be coated and the wall; and
   a clamping device for bracing of the interior component with the molded part, said clamping device comprising a pivotable clamping lever comprising clamping pins which project in a direction of the molded part, free ends of the clamping pins being placed against a rear side of the interior component which faces away from said gap;

wherein:

during coating, the gap between the surface to be coated and the wall is filed with a liquid surface coating material; and said material is cured by exposure to ultraviolet radiation.

2. The device as claimed in claim 1, wherein the clamping device further comprising a frame supporting the molded part.

3. The device as claimed in claim 1, wherein the molded part is formed such that it is transparent to ultraviolet radiation.

4. The device as claimed in claim 3, wherein the molded part comprises a supporting element which is transparent to ultraviolet radiation and can be mechanically loaded.

5. The device as claimed in claim 4, wherein the supporting element is produced from UV-radiation-transparent plastics or glass material.

6. The device as claimed in claim 4, wherein the supporting element is produced from quartz glass.

7. The device as claimed in claim 1, wherein the molded part has a UV-radiation-transparent mold which substantially corresponds to a shape of the surface to be coated.

8. The device as claimed in claim 7, wherein the mold is produced from silicone.

9. The device as claimed in claim 1, further comprising a sealing element surrounding the interior component in a circumferential direction in the region of the surface to be coated.

10. The device as claimed in claim 9, wherein the sealing element is connected in one piece to the molded part.

11. The device as claimed in claim 1, wherein the molded part forms a receptacle for forming the gap, onto which the interior component can be placed.

12. The device as claimed in claim 1, further comprising at least one spacing element, which can be positioned between the molded part and the region of the surface to be coated of the interior component.

13. The device as claimed in claim 12, wherein the at least one spacing element is produced from silicone or from polished metal.

* * * * *

UNITED STATES PATENT AND TRADEMARK OFFICE
CERTIFICATE OF CORRECTION

| | | |
|---|---|---|
| PATENT NO. | : 7,384,253 B2 | Page 1 of 1 |
| APPLICATION NO. | : 11/698005 | |
| DATED | : June 10, 2008 | |
| INVENTOR(S) | : Berg et al. | |

It is certified that error appears in the above-identified patent and that said Letters Patent is hereby corrected as shown below:

Column 7, line 6: "filed" is corrected to read: -- filled --.

Signed and Sealed this

Twenty-sixth Day of August, 2008

JON W. DUDAS
*Director of the United States Patent and Trademark Office*